UNITED STATES PATENT OFFICE.

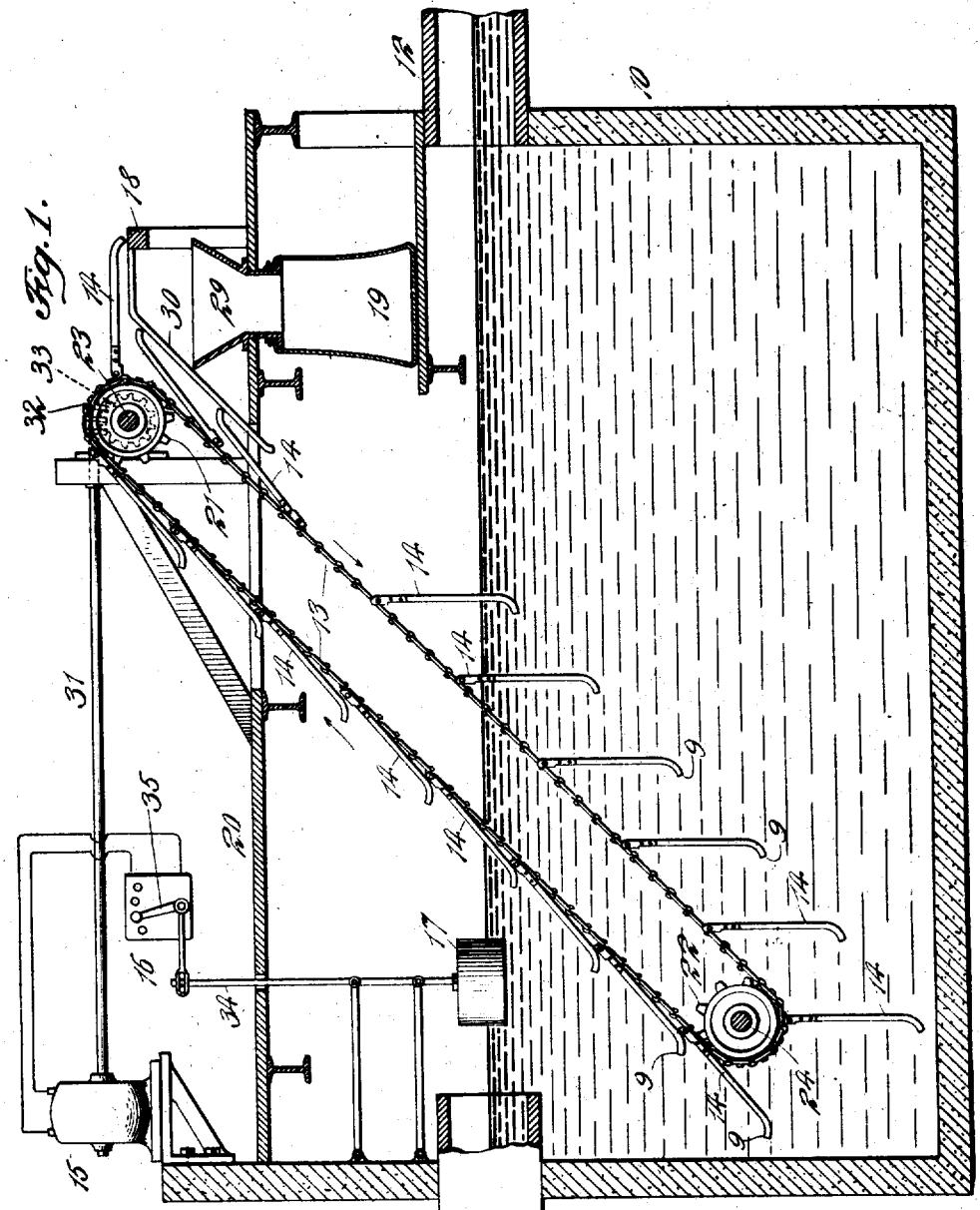

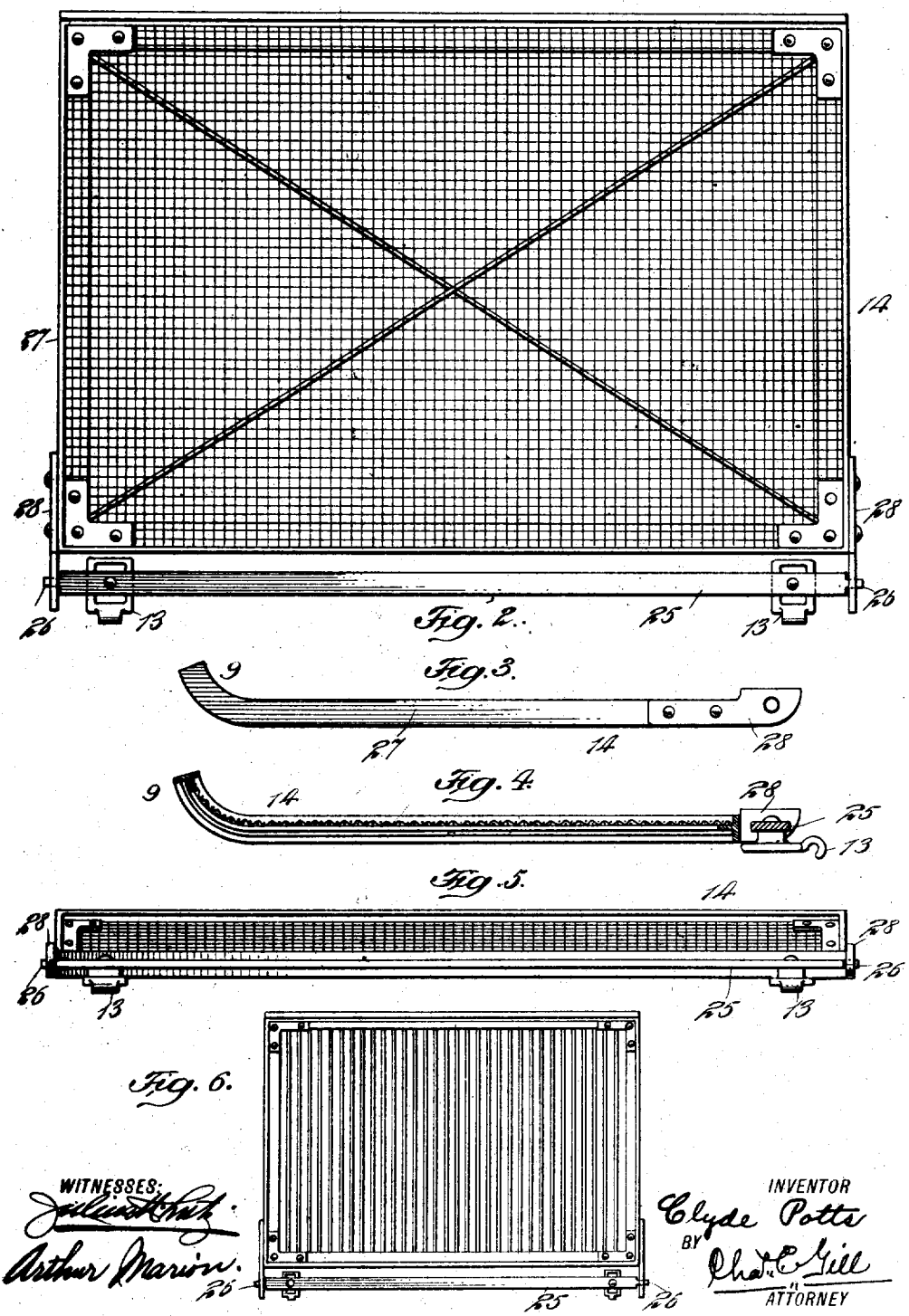

CLYDE POTTS, OF MORRISTOWN, NEW JERSEY.

APPARATUS FOR SCREENING SEWAGE AND OTHER FLOWING MATTER.

973,697.

Specification of Letters Patent. Patented Oct. 25, 1910.

Application filed May 27, 1910. Serial No. 563,687.

*To all whom it may concern:*

Be it known that I, CLYDE POTTS, a citizen of the United States, and a resident of Morristown, in the county of Morris and State of New Jersey, have invented certain new and useful Improvements in Apparatus for Screening Sewage and other Flowing Matter, of which the following is a specification.

The invention relates to improvements in apparatus for use in screening sewage and other flowing matter, and it consists in the novel features and coöperative arrangements of parts hereinafter described and particularly pointed out in the claims.

I present my invention herein as embodied in an apparatus employed in the treatment of sewage, said apparatus being interposed between the septic tank and contact-beds or filter-beds, as the case may be, and used for screening the sewage on its flow from said tank to said beds. The screen is of endless character and when in use is caused to constantly move across the path of the flowing sewage so that the latter on its travel to the beds is compelled to pass through the screen, and said screen is composed of sections which as they in succession ascend from the sewage and reach a proper location are, due to the construction and arrangement presented, automatically jarred to cause the solid matter to fall therefrom into a suitable receptacle placed to receive the same, said receptacle preferably being a bag which upon becoming full may be thrown into a furnace and incinerated. The screen-sections, one after another, thus automatically become cleaned or freed from solid matter and thereafter pass into the path of the flowing sewage to perform their duty in screening the same. I also provide means for automatically varying the speed of travel of the screen across the path of the flowing sewage in accordance with the quantity of suspended matter carried in the liquid or, consequently, the work to be performed by the screen, it being desirable that the screen should travel more rapidly in instances in which there may be an excessive quantity of solid matter contained in the flowing sewage.

While I have perfected my invention for use in the treatment of sewage, I am aware that it is useful in screening other liquids containing solids or suspended matter or trade wastes and hence do not limit the same to processes involving the treatment of sewage alone.

The invention and satisfactory means for carrying the same into effect will be understood from the detailed description hereinafter presented, reference being had to the accompanying drawings, in which:

Figure 1 is a central vertical longitudinal section of an apparatus embodying my invention, the screen-sections being shown in edge elevation; Fig. 2 is an enlarged face view of one of the screen sections and illustrates the connection of the same with the endless chain carrying said sections; Fig. 3 is an edge view of the same, omitting the connections of the section with the chain; Fig. 4 is a central vertical transverse section through the same, with the connections of the same to the chain shown; Fig. 5 is an edge view of the same taken from the right hand edge of Fig. 4 or the lower edge of Fig. 2; and Fig. 6 is a view corresponding with Fig. 2 but on a smaller scale and showing the screen-section as composed of bars instead of wire-mesh, it not being intended to limit the invention to any particular character of screen-material, since either perforated plates, wire-cloth or bars may be employed.

In the drawings, 10 designates an elongated tank through which the flow of sewage or other liquid takes place; 11 a pipe directing the liquid into said tank and which may lead from a septic-tank, not shown, if sewage is under treatment; 12 the outflow pipe from said tank 10 and which may lead to a distributing apparatus of the character, for example, illustrated in Letters Patent No. 935,231 granted to me September 28, 1909 for delivery to contact beds or filter beds of the character, for illustration, shown in Letters Patent No. 955,683 granted to me April 19, 1910; 13 an endless sprocket chain carrying screen-sections 14 hinged at one edge thereto; 15 a motor for driving said endless chain; 16 a controller of usual character operable by a float 17 for varying the speed of said motor and consequently of the travel of said chain; 18 a rigid bar or block against which the screen-sections are in succession after ascending through the sewage caused to strike for jarring the solid or non-liquid matter therefrom; 19 a removable bag or other suitable receptacle placed to receive the solid matter jarred from the screen-sections, and 20 a platform covering over the major portion of the tank 10.

The tank 10 may be made of concrete and the inlet and outlet pipes 11, 12 are located suitably above the bottom thereof and preferably in line with each other, as shown. The length of the tank 10 may vary considerably but its width should correspond substantially or as nearly as may be with the width of the screen-sections 14 so that the flow from the inlet pipe 11 to the outlet pipe 12 must be against the screen-sections, the latter allowing the liquid to pass through them and arresting on their surfaces which face the direction of the flow the matter in suspension carried by the liquid.

The endless chain 13 is mounted on sprocket wheels 21, 22 secured on suitable shafts 23, 24, and the members of said chain are at uniform intervals connected together by transverse bars 25 whose ends are reduced to form pintles or pivots 26 to receive in a hinged manner the upper ends of the screen-sections 14.

The screen-sections 14 correspond with one another in size and construction and each comprises a rectangular frame 27 to which the wire or screening mesh is secured and which at its lower end curves outwardly, as at 9, for the purpose of increasing the utility of the screen and of facilitating the cleaning of the same, as hereinafter described. The frame 27 will be of metal and it may be an integral casting or made up of separate pieces of metal secured together, the main purpose being to secure strength and durability as well as effectiveness. At the opposite sides of the upper end of each screen-section 14 are secured bars 28 having ends which project beyond the upper edge of the screen-frame and are apertured to pass upon the pintles 26 formed at the ends of the bar 25, as more clearly shown in Fig. 2. The bars 28 with the pintles 26 serve to hingedly connect the screen sections with the sprocket chain 13. The relation of the screen-sections 14 to one another and to the chain 13 is illustrated in Fig. 1 in which it will be seen that said screen sections at the upper side or reach of the chain completely cover the same and form in effect a continuous upwardly traveling screening surface. The screen-sections when at the lower side or reach of the chain hang downwardly free of each other, this being due to the fact that the chain is inclined. The screens are of substantially the same width as the tank 10 and therefore the liquid flowing through the pipe 11 and tank 10 must necessarily pass through the screen-sections traveling upwardly on and with the upper reach or side of the chain 13, the solid or suspended matter in the liquid being arrested by the screens and the liquid passing to the outlet 12. As the screen-sections 14 are carried around the sprocket-wheels 22, they gradually and naturally take a position in line with and lie against the upper side of the chain, and as said screen-sections reach the upper sprocket-wheels 21 and are carried over the same, they, one after another, fall or are thrown against the block 18, as indicated in Fig. 1, the outer curved end of the screen-frame striking the block and at such time the surface of the screen which had collected the solid matter on its upward travel through the liquid, being faced downwardly. The blow of the screen-section against the block 18 is provided for the very important purpose of jarring the solid matter from the face of the screen, so that when the section again enters the liquid it may be clean and in proper condition to perform its duty. The blow of the screen-section against the block 18 jars the entire screen-section, with the result that the solid matter that had been collected thereby will fall therefrom into a hopper 29 and pass thence to the receptacle 19. The chain 13 has a continuous travel and hence the screen sections are, one after another, caused to strike the block 18 and become thereby cleaned. I provide adjacent to each end of the block 18 a guide 30 along which the screen-sections as they leave the block 18 may drag and which holds said sections clear of the hopper 29. The guides 30 are bars defining an outline within which the upper portion of the hopper 29 is located and which bars are so shaped as to compel the screen sections after leaving the block 18 to fold upwardly to some extent and travel in that condition beyond the neighborhood of the hopper 29. When the screen-sections leave the bars 30 they swing downwardly into vertical position, as will be understood by reference to Fig. 1. The receptacle 19 which receives the solid matter from the screen-sections is intended to be removable so that when filled it may be taken away and another receptacle substituted.

The shaft 23 is the driving shaft for the sprocket wheels 21 and chain 13 and said shaft preferably receives its motion from the electric motor 15 through a shaft 31, worm 32 and worm wheel 33, the latter being rigid on the shaft 23 and being engaged by the worm 32 on the shaft 31, which is driven from the motor 15. The speed of travel of the chain 13 and screen-sections 14 should vary in accordance with the condition of the sewage or other matter passing through the tank 10. If the sewage should contain a large quantity of suspended matter to be removed by the screens, the chain 13 should be driven more rapidly than if the sewage contained a small amount of suspended matter, since when the sewage is thick or contains a large quantity of solids or matter in suspension, a greater duty is imposed on the screen and its surfaces should be cleaned and re-presented for action with some degree of rapidity. When the sewage contains matter in suspension to a greater degree than usual or normal, the liquid will not pass through the screens so readily and will, as a consequence, back up in the tank 10 at the upper side of the traveling screen, and I utilize this condition of affairs as a means for automatically governing the speed with which the chain 13 shall travel by providing the float 17 connected with the arm of the controller 16. Under normal conditions the float will remain at the predetermined level of the liquid in the tank 10 and have no special effect on the controller 16 or motor 15, the chain then traveling at its predetermined normal rate or speed. In the event, however, of sewage of thicker nature entering the tank and meeting the resistance to its flow offered by the screen sections 14, the level of sewage in the tank at the upper side of the screen will rise and cause the float 17 to move upwardly, with the result that the rod 34 of the float will move the arm 35 of the controller to a position to increase the speed of the motor 15 and consequently the speed of travel of the chain 13. The travel of the chain 13 is thus automatically governed by the nature or condition of the liquid flowing through the tank 10.

There is ordinarily very little loss of head or fall in the sewage passing through the tank 10, and hence I am enabled to employ the float 17 as a part of a governor for speeding up the traveling screen when sewage backs up on the upper or operating side of the same.

The curved ends 9 on the screen sections serve, during the operation of the apparatus, to retard the downward passage of solid or semi-solid matter from the screen sections and increase the capacity of the sections for performing the duty required of them, and said curved ends 9 strike the block 18 when the screen sections pass over the upper sprocket wheels 21 and take the direct force of the blow with less damage to said sections than might be caused if the outer ends of the sections were flat.

The screen-section shown in Fig. 6 embodies a slight modification of the screen section shown in Fig. 2 in that it illustrates bars in lieu of wire cloth for performing the screening operation.

I do not limit the invention to all of the details of form, arrangement and construction that I have hereinbefore described, nor do I confine the invention to the driving of the traveling sectional screen from an electric motor.

I have described and in the drawings shown the most desirable construction known to me for the entire apparatus, but I am aware that the screen-sections and other parts may vary in detail to a considerable extent without departing from the spirit of my invention, which I desire to broadly claim.

What I claim as my invention and desire to secure by Letters Patent, is:

1. Screening apparatus interposed in the path of a flowing stream and extending without the same and occupying substantially the width of the channel for such flow, comprising a traveling sectional screen composed of an endless carrier and a series of successive screen-sections hinged at one edge thereto and adapted to swing outwardly therefrom as they successively pass a definite location without the stream, means for driving said carrier, and means for jarring the successive individual screen-sections after they leave the stream and while they are turned outwardly from said carrier, for removing the collected matter from said sections; substantially as set forth.

2. Screening apparatus interposed in the path of a flowing stream and extending without the same and occupying substantially the width of the channel for such flow, comprising a traveling sectional screen composed of an endless carrier and a series of successive screen-sections hinged at one edge thereto and adapted to swing outwardly therefrom as they successively pass a definite location without the stream, means for driving said carrier, and means for jarring the successive individual screen-sections after they leave the stream and while they are turned outwardly from said carrier, for removing the collected matter from said sections combined with means for automatically varying the speed of travel of the screen by and in accordance with the quantity of suspended matter in the stream.

3. Screening apparatus interposed in the path of a flowing stream and extending without the same and occupying substantially the width of the channel for such flow, comprising a traveling sectional screen, an endless carrier to which the screen-sections are hinged at their upper ends, upper and lower supports for said carrier, means for driving the carrier, and a block against which the screen-sections strike as they successively pass over the upper support and are thereby reversed, for the purpose of jarring the collected matter therefrom.

4. Screening apparatus interposed in the path of a flowing stream and extending without the same and occupying substantially the width of the channel for such flow, comprising a traveling sectional screen, an endless carrier to which the screen-sections are hinged at their upper ends, upper and lower supports for said carrier, means for driving the carrier, and a block against which the screen-sections strike as they successively pass over the upper support and are thereby reversed, for the purpose of jarring the collected matter therefrom, said screen-sections having outwardly curved lower ends.

5. Screening apparatus interposed in the path of a flowing stream and extending without the same and occupying substantially the width of the channel for such flow, comprising a traveling sectional screen, an endless carrier to which the screen-sections are hinged at their upper ends, upper and lower supports for said carrier, means for driving the carrier, and a block against which the screen-sections strike as they successively pass over the upper support and are thereby reversed, for the purpose of jarring the collected matter therefrom, combined with means for automatically varying the speed of travel of said carrier in accordance with the quantity of suspended matter in the stream.

6. Screening apparatus interposed in the path of a flowing stream and extending without the same and occupying substantially the width of the channel for such flow, comprising a traveling sectional screen, an endless carrier to which the screen-sections are hinged at their upper ends, upper and lower supports for said carrier, means for driving the carrier, a block against which the screen-sections strike as they successively pass over the upper support and are thereby reversed, for the purpose of jarring the collected matter therefrom, means adjacent to said block for receiving the matter jarred from the screens, and a guide for the screen-sections as they leave said block for directing them to avoid contact with said receiving means.

7. Apparatus for screening suspended matter from a flowing stream, comprising a tank having an inlet and an outlet for the flowing stream, an inclined traveling sectional screen within and extending above said tank and occupying substantially the width of the tank so as to intercept the stream, an endless carrier to which the screen-sections are hinged at their upper ends, upper and lower supports for said carrier, means for driving the carrier, a block against which the screen-sections strike as they successively pass over the upper support and are thereby reversed, for the purpose of jarring the collected matter therefrom, a float at the upper side of the screen, and means connected with said float and the driving means for varying the speed of the latter with variations in the level of the liquid at the upper side of the screen.

8. Apparatus for screening suspended matter from a flowing stream, comprising a tank having an inlet and an outlet for the flowing stream, an inclined traveling sectional screen within and extending above said tank and occupying substantially the width of the tank so as to intercept the stream, an endless chain to which the screen-sections are hinged at their upper ends, upper and lower sprocket-wheels for said chain, means for driving said chain, and a block against which the screen-sections strike as they successively pass over the upper sprocket-wheels and become reversed thereby, for the purpose of jarring the collected matter from said sections.

9. Apparatus for screening suspended matter from a flowing stream, comprising a tank having an inlet and an outlet for the flowing stream, an inclined traveling sectional screen within and extending above said tank and occupying substantially the width of the tank so as to intercept the stream, an endless chain to which the screen-sections are hinged at their upper ends, upper and lower sprocket-wheels for said chain, means for driving said chain, and a block against which the screen-sections strike as they successively pass over the upper sprocket-wheels and become reversed thereby, for the purpose of jarring the collected matter from said sections, combined with means for varying the speed of said chain with variations in the level of the liquid at the upper side of the screen.

10. Screening apparatus interposed in the path of a flowing stream and extending without the same and occupying substantially the width of the channel for such flow so as to intercept the stream, comprising an inclined endless traveling screen, means for driving the same, a float in the stream in advance of the screen, and means connected with said float and the driving means for varying the speed of the latter with variations in the level of the liquid at the upper side of the screen.

Signed at New York city, in the county of New York and State of New York, this 25th day of May A. D. 1910.

CLYDE POTTS.

Witnesses:
ARTHUR MARION,
CHAS. C. GILL.